United States Patent
Peng et al.

(10) Patent No.: US 12,068,949 B2
(45) Date of Patent: Aug. 20, 2024

(54) ROUTING MANAGEMENT METHOD AND APPARATUS, NETWORK DEVICE, AND READABLE STORAGE MEDIUM

(71) Applicant: ZTE CORPORATION, Guangdong (CN)

(72) Inventors: Shaofu Peng, Guangdong (CN); Bing Song, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 353 days.

(21) Appl. No.: 17/622,743

(22) PCT Filed: Jun. 24, 2020

(86) PCT No.: PCT/CN2020/097966
§ 371 (c)(1),
(2) Date: Dec. 24, 2021

(87) PCT Pub. No.: WO2021/004277
PCT Pub. Date: Jan. 14, 2021

(65) Prior Publication Data
US 2022/0255853 A1     Aug. 11, 2022

(30) Foreign Application Priority Data
Jul. 11, 2019  (CN) .......................... 201910625792.4

(51) Int. Cl.
*H04L 45/02* (2022.01)
*H04L 12/46* (2006.01)
*H04L 45/00* (2022.01)

(52) U.S. Cl.
CPC .......... *H04L 45/34* (2013.01); *H04L 12/4633* (2013.01); *H04L 45/02* (2013.01)

(58) Field of Classification Search
CPC ..... H04L 12/4633; H04L 45/02; H04L 45/24; H04L 45/28; H04L 45/34; H04L 45/50; H04L 45/64; H04L 47/825
(Continued)

(56) References Cited

U.S. PATENT DOCUMENTS

2016/0261474 A1   9/2016   Raghavan et al.
2016/0277290 A1   9/2016   Sivabalan et al.
(Continued)

FOREIGN PATENT DOCUMENTS

CN   105745880 A   7/2016
CN   107181684 A   9/2017
(Continued)

OTHER PUBLICATIONS

China Patent Office, Second Office Action issued Mar. 31, 2023 for application No. CN201910625792.4.
(Continued)

*Primary Examiner* — Harun Chowdhury
(74) *Attorney, Agent, or Firm* — Li & Cai Intellectual Property (USA) Office (57) ABSTRACT

The present disclosure provides a routing management method and apparatus, a network device, and a readable storage medium. The method comprises: a controller obtaining network topology information of a network side; the controller calculating, on the basis of the network topology information, path information of a segment routing traffic engineering (SR-TE) instance to be created, and sending the path information to a header node of the network side, wherein the path information comprises segment list information and entropy label (EL) insertion position information; and the controller creating the SR-TE instance from the header node to a tail node on the network side.

19 Claims, 4 Drawing Sheets

(58) Field of Classification Search
USPC .......................................... 370/235, 238, 392
See application file for complete search history.

(56) References Cited

U.S. PATENT DOCUMENTS

| | | | |
|---|---|---|---|
| 2017/0012895 A1* | 1/2017 | Zhao | ........................ H04L 45/04 |
| 2018/0026933 A1 | 1/2018 | Asati et al. | |
| 2018/0212872 A1* | 7/2018 | Zhuang | ................. H04L 47/825 |
| 2021/0092052 A1* | 3/2021 | Tantsura | ................. H04L 45/34 |
| 2021/0176170 A1* | 6/2021 | Decraene | ............ H04L 12/4633 |
| 2021/0226882 A1* | 7/2021 | Chen | ........................ H04L 45/64 |

FOREIGN PATENT DOCUMENTS

| | | |
|---|---|---|
| CN | 108632146 A | 10/2018 |
| CN | 109587009 A | 4/2019 |

OTHER PUBLICATIONS

European Patent Office, The extended European search report issued May 24, 2023 for application No. EP20837025.4.
Li Li Huawei Z: "BGP request for advertising candidate path of segment routing TE policies; draft-li-ldr-bgp-request-cp-sr-te-policy-00. txt", BGP request for advertising candidate path of segment routing TE policies; draft-li-ldr-bgp-request-cp-sr-te-policy-00. txt; Internet-draft: network working group, Internet engineering task force, IETF, Jul. 8, 2019, pp. 1-13, XP015134158.
Kini K Kompella Juniper S Sivabalan Ciscos Litkowski Orange R Shakir Google J Tantsura S: "Entropy label for SPRING tunnels; draft-ietf-mpls-spring-entropy-label -12. txt", Entropy label for SPRING tunnels; draft-ietf-mpls-spring-entropy-label -12. txt; Internet-draft: network working group, Internet engineering task force, IETF; standardwokingdraft, Internet society (ISOC) 4, Rue Des Falaises CH-1205 Geneva, Switzerlan, No. 12, Jul. 16, 2018, pp. 1-26, XP015127732.
Peng Q Xiong Zte Corporation S: "PCEP extension for SR-MPLS entropy label position; draft-peng-pce-entropy-label position-00. txt", PCEP extension for SR-MPLS entropy label position; draft-peng-pce-entropy-labelposition-00. txt; Internet-draft: PCE, Internet engineering task force, IETF; standardwokingdraft, Internet society (ISO, Jul. 23, 2019, pp. 1-8, XP015134454.
China Patent Office, First Office Action issued Nov. 8, 2022 for application No. CN201910625792.4.
S. Kini, et al., "Entropy label for spring tunnels", Network Working Group, Internet-Draft, Jul. 16, 2018.
S. Sivabalan, et al., "PCEP extensions for segment routing", PCE, Internet-Draft, Mar. 4, 2019.
WIPO, International Search Report issued on Aug. 13, 2020.

* cited by examiner

ROUTING MANAGEMENT METHOD AND APPARATUS, NETWORK DEVICE, AND READABLE STORAGE MEDIUM

The present application is a National Stage of International Application No. PCT/CN2020/097966, filed on Jun. 24, 2020, which claims priority to Chinese Patent Application No. 201910625792.4 filed on Jul. 11, 2019, in Chinese Patent Office, both of which are incorporated by reference herein in their entireties.

TECHNICAL FIELD

The present disclosure relates to, but is not limited to, the field of communication technology.

BACKGROUND

Segment Routing (SR) technology is a routing method based on a source node. The source node adds a layer of ordered instruction list information to a data packet, and shortest path forwarding is performed segment by segment in a data plane according to the ordered instruction list information. For a Segment Routing-Traffic Engineering (SR-TE) instance, it is needed to consider a Maximum Segment Identifier Depth (Maximum SID (MSD)) capability of a head node (that is, a network-side head node), and an Entropy Readable Label Depth (ERLD) capability of each node contained in a segment list, etc. In many cases, the SR-TE will involve crossing domains. However, there is a lack of notification and processing mechanism for an insertion position of an Entropy Label (EL) in a label stack.

SUMMARY

According to one aspect of an embodiment of the present disclosure, provided is a routing management method, including: obtaining, by a controller, network topology information of a network side; calculating, by the controller, path information of an SR-TE instance to be created, based on the network topology information, and sending the path information to a network-side head node; where the path information includes segment list information and EL insertion position information; and creating, by the controller, the SR-TE instance from the network-side head node to a tail node.

According to another aspect of the embodiment of the present disclosure, provided is a routing management apparatus, including: a topology acquisition module, configured to obtain network topology information of a network side; a path processing module, configured to calculate path information of an SR-TE instance to be created, based on the network topology information, and send the path information to a network-side head node; where the path information includes segment list information and EL insertion position information; and an instance creation module, configured to create the SR-TE instance from the network-side head node to a tail node.

According to yet another aspect of the embodiment of the present disclosure, provided is a network device, including a processor, a memory, and a communication bus, where the communication bus is configured to enable a communication connection between the processor and the memory; and the processor is configured to execute one or more computer programs stored in the memory, to implement a step of the above-mentioned routing management method.

According to yet another aspect of the embodiment of the present disclosure, provided is a computer storage medium having one or more programs stored thereon, where the one or more programs are configured to, when executed by one or more processors, a step of the above-mentioned routing management method is implemented.

DETAILED DESCRIPTION

The specific embodiment of the present disclosure will be described further in detail below through the detailed description with reference to the drawings, to make purposes, technical schemes and advantages of the disclosure clearer. It should be understood that the specific embodiment described herein is only used to explain the present disclosure, and is not intended to limit the present disclosure.

Figure 1:
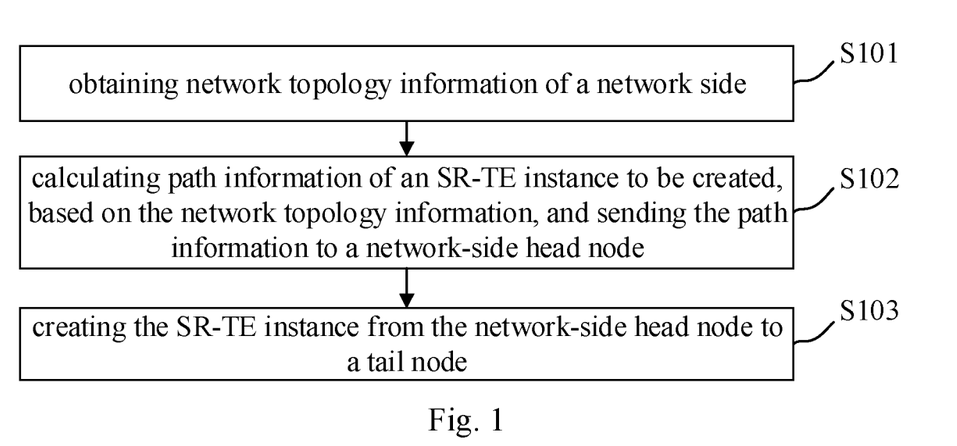
FIG. 1 is a flowchart of a routing management method provided by the embodiment of the present disclosure.

The embodiment of the present disclosure provides a routing management method. As shown in FIG. 1, which is a flowchart of the routing management method provided by the embodiment of the present disclosure, the method includes steps S101, S102 and S103.

In step S101, network topology information of a network side is obtained.

In step S102, path information of an SR-TE instance to be created is calculated based on the network topology information, and the path information is sent to a network-side head node. The path information includes segment list information and EL insertion position information.

In step S103, the SR-TE instance from the network-side head node to a tail node is created.

The SR technology is a routing method based on a source node. The source node adds a layer of ordered instruction list information to a data packet, and shortest path forwarding is performed segment by segment in a data plane according to the ordered instruction list information. This approach forces a flow to pass any path and service chain simply by maintaining a state of each flow on the source node, and neither an intermediate node nor a tail node needs to maintain the state of the flow. The SR is able to be applied to a Multi-Protocol Label Switching (MPLS) forwarding plane and an Internet Protocol Version 6 (IPv6) forwarding plane, which are called as SR-MPLS and SR-IPv6, respectively. It is generally recommended that the SR-MPLS is used by a core network and the SR-IPv6 is used by an edge network without the MPLS forwarding plane (such as a home network, a data center).

The EL is used to implement an Equal Cost Multi-Path (ECMP) forwarding mechanism on the MPLS forwarding plane. In a label stack encapsulated in a packet to be forwarded, an Entropy Label Indicator (ELI, which is a reserved Label 7) and the EL are generally inserted after a tunnel label, to enable each intermediate node of a tunnel to select a specific path of load balancing based on the EL. It should be noted that in the label stack the EL should follow the ELI immediately. For performing ECMP forwarding on an MPLS label packet in an SR network based on the EL, factors to be considered when inserting the EL into the label stack and recommended algorithms are described. For example, for the SR-TE instance, an MSD capability of the network-side head node, and an ERLD capability of each node contained in a segment list and so on should be considered. As long as these pieces of information are sufficiently obtained, an algorithm can be performed to calculate a position in the label stack into which the EL to be inserted.

A controller may create the SR-TE instance actively; and/or the controller may create the SR-TE instance in response to an SR-TE instance creation request initiated by the network-side head node (i.e., a head node of the SR-TE instance). When the controller creates the SR-TE instance actively or in response to the SR-TE instance creation request from the network-side head node, a calculated SR-TE path result is sent to the network-side head node. In addition to traditional segment list path information (i.e., the segment list information), the calculated SR-TE path result further includes the EL insertion position information.

After receiving the above-mentioned SR-TE path result, the network-side head node creates a corresponding SR-TE forwarding entry on the forwarding plane. In addition to traditional Next Hop Label Forwarding Entry (NHLFE) information (i.e., NHLFE forwarding information), such as an outgoing interface, a next hop and an outgoing label stack, generated according to the segment list, this forwarding entry further records the corresponding EL insertion position information for the outgoing label stack. Therefore, for service traffic to be carried and forwarded on the SR-TE instance, the network-side head node may insert the ELI and the EL into the outgoing label stack of the packet to be forwarded based on the above-mentioned EL insertion position information, after an algorithm is executed locally to generate a corresponding EL value according to traffic load information. The EL insertion position information may include whether to insert the EL and one or more positions into which the EL to be inserted.

In some examples, sending the path information to the network-side head node may include: sending the path information to the network-side head node, through a PCEP session established between the controller and the network-side head node; or sending the path information to the network-side head node, through a BGP session established between the controller and the network-side head node.

Figure 2:
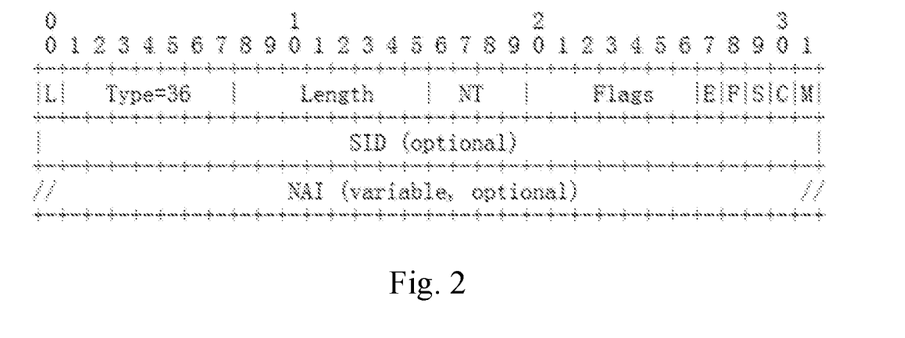
FIG. 2 is a schematic diagram of an encapsulation format of an extended Path Computation Element Communication Protocol (PCEP) provided by the embodiment of the present disclosure.

In some examples, the EL insertion position information may be notified based on an extended PCEP in the following ways: in order to represent one SR-TE path, an Explicit Route Object (ERO) is used by the PCEP to describe a corresponding segment list, the ERO contains one or more Segment Routing-Explicit Route Object Sub-objects (that is, SR-ERO Sub-objects) in order, and each SR-ERO Sub-object represents a node segment or an adjacency segment. FIG. 2 shows a schematic diagram of an encapsulation format of the extended PCEP provided by the embodiment of the present disclosure. FIG. 2 specifically illustrates one encapsulation format for the SR-ERO Sub-object, in which F, S, C, and M-flags have been defined. According to the embodiment of the present disclosure, an E-flag (Entropy flag) is newly added on this basis. If a value of the E-flag is 0, it indicates that a position after the segment is not a position into which the EL to be inserted; and if the value of the E-flag is 1, it indicates that the position after the segment is the position into which the EL to be inserted.

Figure 3:
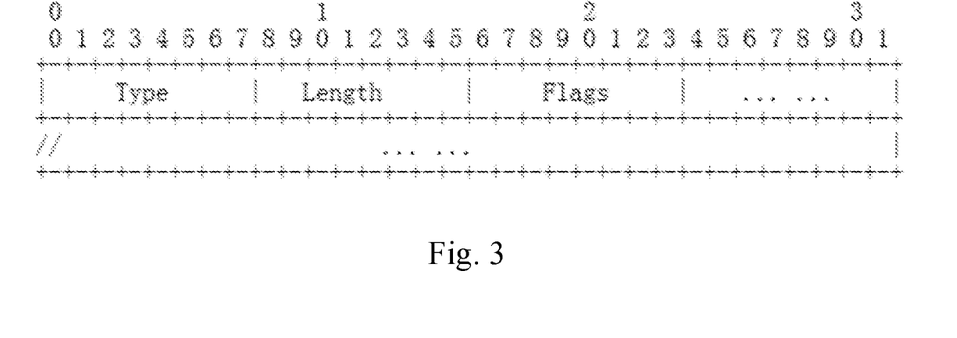
FIG. 3 is a schematic diagram of an encapsulation format of an extended Border Gateway Protocol (BGP) provided by the embodiment of the present disclosure.

In some examples, the EL insertion position information may be notified based on an extended BGP in the following ways: in the SR network, the controller delivers the path calculation result of a SR-TE policy to the network-side head node through a BGP channel, describes the SR-TE policy by using SR Policy SAFI (Subsequent Address Family Identifier) NLRI (Network Layer Reachability Information), the SR-TE policy may contain a plurality of segment lists, and each segment list is represented by a corresponding Segment List Sub-TLV (Sub-Type Length Value). The Segment List Sub-TLV contains one or more Segment Sub-TLVs in order, and each Segment Sub-TLV represents a node segment, an adjacency segment or a segment of other types. Currently, there are as many as 11 types of Segment Sub-TLVs. The differences of respective types are mainly reflected in that identification information of a segment may be one or a combination of an Internet Protocol (IP) address, an interface index, an SID or an MPLS label. FIG. 3 shows a schematic diagram of an encapsulation format of the extended BGP provided by the embodiment of the present disclosure. FIG. 3 specifically illustrates a common encapsulation format for different types of Segment Sub-TLVs, in which V and A-flags have been defined. According to the embodiment of the present disclosure, the E-flag is newly added on this basis. If a value of the E-flag is 0, it indicates that a position after the segment is not a position into which the EL to be inserted; and if the value of the E-flag is 1, it indicates that the position after the segment is the position into which the EL to be inserted.

In some examples, when the path information is sent to the network-side head node through the PCEP session established between the controller and the network-side head node, sending the path information to the network-side head node, may include: describing the segment list and the EL insertion position information by using the ERO. The ERO includes at least one SR-ERO Sub-object. Specifically, the encapsulation format of the SR-ERO Sub-object includes the F, S, C, M-flags and E-flag. The value of the E-flag is used for indicating the EL insertion position information.

In some examples, when the path information is sent to the network-side head node through the BGP session established between the controller and the network-side head node, sending the path information to the network-side head node may include: describing the segment list and the EL insertion position information by using the Segment List Sub-TLV. The Segment List Sub-TLV includes at least one Segment Sub-TLV. Specifically, the encapsulation format of the Segment Sub-TLV includes the V, A-flags and E-flag. The value of the E-flag is used for indicating that the EL insertion position information is immediately after the Segment Sub-TLV.

In some examples, the SR-TE instance may include: an SR-TE tunnel, and/or the SR-TE policy.

In some examples, the method may further include: converting the path information to NHLFE forwarding information, and sending the NHLFE forwarding information to the forwarding plane. For example, after receiving the segment list of the SR-TE instance, the network-side head node converts the segment list into the NHLFE forwarding information for actual forwarding. For example, {Node-SID (to P1), Node-SID (to ASBR1), Peer Node-SID (to ASBR2), Node-SID (to P2), Adj-SID (to LAG)} will be converted to an outgoing Label stack {Label (to P1), Label (to ASBR1), Label (to ASBR2), Label (to P2), Label (to LAG)}, and an actual forwarding interface and next-hop node information are obtained according to the first segment. The network-side head node delivers the SR-TE instance and the NHLFE forwarding information to the forwarding plane. In particular, the forwarding plane is notified that positions immediately after Label (to ASBR2) and immediately after Label (to LAG) in the outgoing label stack are positions into which the EL to be inserted.

In some examples, the method may further include: calculating and obtaining a corresponding EL according to service load content of a service packet. The forwarding plane on the network-side head node calculates the corresponding EL of the service packet to be forwarded along the SR-TE instance based on the service load content, and inserts the EL into a specified insertion position in the outgoing label stack of the SR-TE instance. That is, when the service packet is forwarded along the SR-TE instance, the outgoing label stack of a tunnel may be changed to {Label (to P1), Label (to ASBR1), Label (to ASBR2), ELI, EL 10, Label (to P2), Label (to LAG), ELI, EL 10}. Also of note is that in the complete label stack encapsulated in the packet, in addition to the above-mentioned tunnel-related labels, there may also be service-related labels, such as a VPN label.

According to the routing management method provided by the embodiment of the present disclosure, the network topology information of the network side may be obtained; the path information of the SR-TE instance to be created is calculated based on the network topology information, the path information is sent to the network-side head node, and the path information may include the segment list information and the EL insertion position information; and the SR-TE instance from the network-side head node to a tail node is created. Through the calculation of network topology information, the EL insertion position information is carried in the path information, so as to realize the notification and processing of the EL insertion position information, and satisfy a scenario that needs to be implemented based on the EL.

Figure 4:
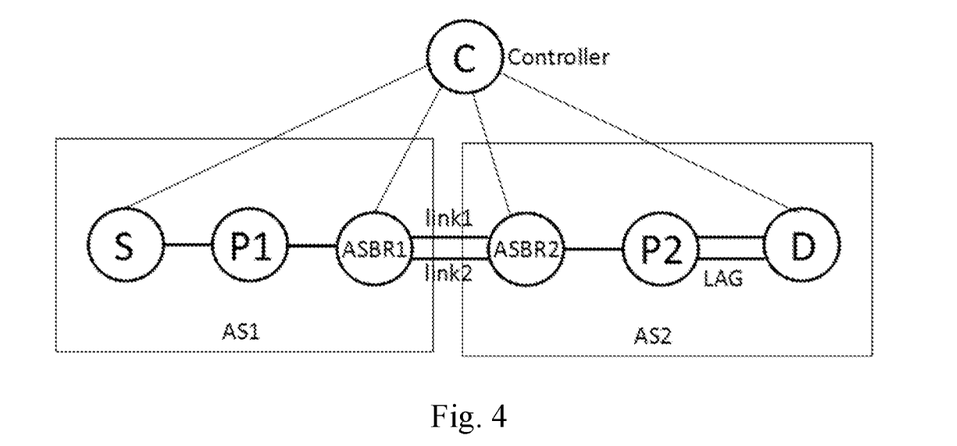
FIG. 4 is a topology diagram of a system network provided by the embodiment of the present disclosure.

In some exemplary examples, as shown in FIG. 4, it is a topology of a system network provided by the embodiment of the present disclosure. In FIG. 4, it is assumed that a Controller C establishes the PCEP session with a network-side head node S, and an SR-TE tunnel (named SR-TE 100) needs to be established from the network-side head node S to a tail node D. The tunnel may be created actively by the network-side head node S or by the Controller C. In this example, although the PCEP session is used to establish the SR-TE tunnel, the PCEP session may also be applied to other SR-TE instances, such as the SR-TE policy. Since the head and tail nodes S and D of the tunnel belong to different autonomous systems (ASs), the Controller C needs to calculate a specific path for the SR-TE tunnel, no matter whether the network-side head node S actively creates the SR-TE tunnel or the Controller C actively creates the SR-TE tunnel. It is assumed that each AS (i.e., AS1 and AS2) contains one Interior Gateway Protocol (IGP) area, and a multi-hop BGP session is established between ASs, i.e., the BGP session is established between a node ASBR1 and a node ASBR2 by using an indirect loopback address. A static route to a loopback address of the node ASBR2 may be configured on the node ASBR1, and an underlying forwarding link is an ECMP formed by a link 1 and a link 2. Similarly, a static route to a loopback address of the node ASBR1 is established on the node ASBR2. A node P2 and the tail node D are connected through a link aggregation group (LAG). To facilitate the TE path calculation, the Controller C may collect the network topology information from the network side in advance. In particular, a BGP Link-State (BGP-LS) mechanism may be used by the Controller C to collect: IGP topology information in each AS, SR capability information and a corresponding IGP Prefix-SID (internal gateway protocol prefix-segment identifier) and Adj-SID (adjacency-segment identifier, Adjency-SID) of each node in the IGP area, MSD capability and ERLD capability information of each node in the IGP area, and connection relationships between the respective ASs and a corresponding BGP Peer Node-SID and Peer Adj-SID.

Figure 5:
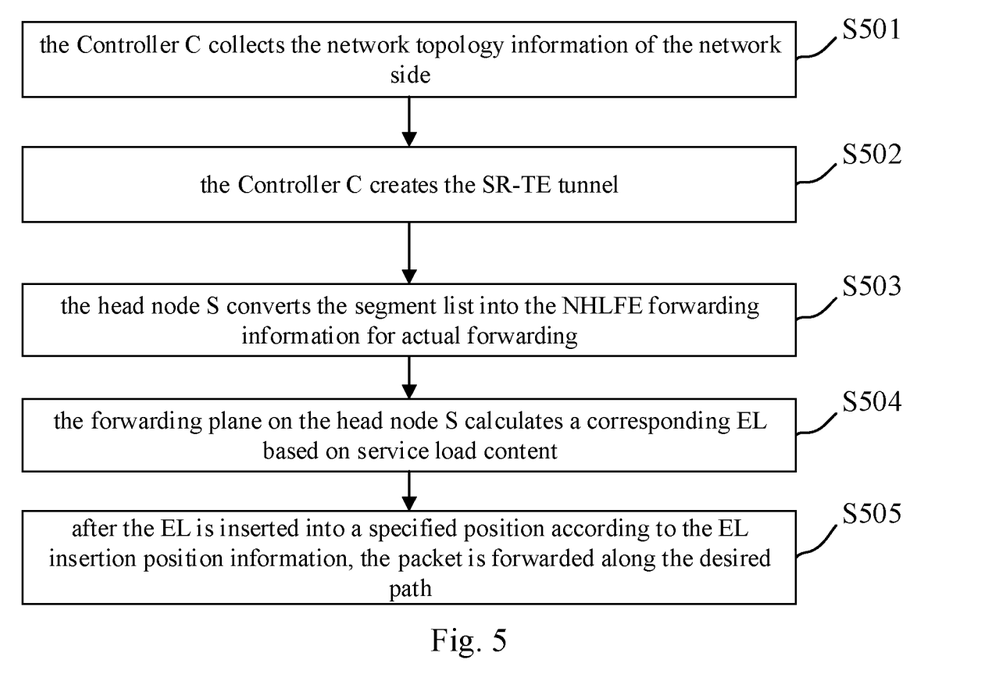
FIG. 5 is another flowchart of a routing management method provided by the embodiment of the present disclosure.

As shown in FIG. 5, it is another flowchart of a routing management method provided by the embodiment of the present disclosure. The routing management method may include step S501 to step S505.

In step S501, the BGP-LS is used by the Controller C to collect the network topology information of the network side. The topology information includes the IGP topology information in the two ASs (i.e., the AS1 and the AS2) and the connection relationship between the two ASs. It is assumed that the MSD and ERLD collected from each node are 20 and 3 respectively.

In step S502, the Controller C actively creates the SR-TE tunnel (i.e., the SR-TE 100) crossing the ASs from the network-side head node S to the tail node D in a PCE-initiated mode, or calculates the SR-TE tunnel (i.e., the SR-TE 100) crossing the ASs from the network-side head node S to the tail node D in response to receiving a PCReq message (i.e., the SR-TE instance creation request) from the network-side head node S. The Controller C calculates the path for the SR-TE tunnel based on the collected network topology information. It is assumed that {Node-SID (to P1), Node-SID (to ASBR1), Peer Node-SID (to ASBR2), Node-SID (to P2), Adj-SID (to LAG)} is the segment list corresponding to the path calculated for the SR-TE tunnel, the Controller C may send the segment list of the SR-TE to the network-side head node S by sending a PCInitiate message or replying to the PCRep message. In particular, according to the network topology information, the Controller C may find that the ECMP exists on the Node ASBR1 according to the forwarding of the Peer Node-SID (to ASBR2), and that the ECMP exists on the Node P2 according to the forwarding of the Adj-SID (to LAG). In this case, the Controller C may set the E-flags to be valid in the SR-ERO Sub-objects respectively corresponding to the above-mentioned two segments (i.e., the Peer Node-SID (to ASBR2) and the Adj-SID (to LAG)) contained in the EROs of the delivered PCEP message, to indicate that positions immediately after these two segments are positions into which the EL to be inserted, and this insertion mode does not exceed an ERLD range of the corresponding node.

In step S503, after receiving the segment list of the SR-TE tunnel (i.e., the SR-TE 100), the network-side head node S converts the segment list into the NHLFE forwarding information for actual forwarding. That is, {Node-SID (to P1), Node-SID (to ASBR1), Peer Node-SID (to ASBR2), Node- SID (to P2), Adj-SID (to LAG)} will be converted to the outgoing Label stack {Label (to P1), Label (to ASBR1), Label (to ASBR2), Label (to P2), Label (to LAG)}, and the actual forwarding interface and the next-hop node information are obtained according to the first segment. The network-side head node S delivers the above-mentioned SR-TE 100 and the NHLFE forwarding information to the forwarding plane. In particular, the forwarding plane is notified that positions immediately after Label (to ASBR2) and immediately after Label (to LAG) in the outgoing label stack are positions into which the EL to be inserted.

In step S504, the forwarding plane on the network-side head node S calculates a corresponding EL (recorded as the EL 10) of a service packet to be forwarded along the SR-TE 100 based on the service load content, and inserts the EL into a specified insertion position in the outgoing label stack of the tunnel SR-TE 100. That is, when the service packet is forwarded along the SR-TE 100, the outgoing label stack will be changed to {Label (to P1), Label (to ASBR1), Label (to ASBR2), ELI, EL 10, Label (to P2), Label (to LAG), ELI, EL 10}. Also of note is that in the complete label stack encapsulated in the packet, in addition to the above-mentioned tunnel-related labels, there may also be the service-related labels, such as the VPN label.

In step S505, the packet in which the label stack is encapsulated is forwarded along the desired path; and in particular, when the packet reaches the node ASBR1, an Incoming Label Map (ILM) entry will be queried based on the Label (to ASBR2) to indicate that the packet is forwarded to the node ASBR2. At this time, ECMP information in the hit ILM entry includes the link 1 and the link 2. The node ASBR1 may continue to read the ELI and the EL 10 in the next layer, and select the link 1 or the link 2 for forwarding according to a value of the EL 10 as an ECMP hash factor. Similarly, when the packet reaches the node P2, the ILM entry is queried and hit according to the Label (to LAG). The ECMP information (composed of a plurality of member links contained in the LAG) also exists in the ILM entry. The node P2 may continue to read the ELI and the EL 10 in the next layer, and select a member link of the LAG for forwarding according to the value of the EL 10 as the ECMP hash factor.

In some exemplary examples, as shown in FIG. 4, it is assumed that the Controller C establishes the BGP session with the network-side head node S, and the Controller C actively creates the SR-TE policy (named SR-TE 200) from the network-side head node S to the tail node D and delivers the SR-TE policy to the network-side head node S through a BGP channel. It is assumed that each AS contains one IGP area, and the multi-hop BGP session is established between the ASs, i.e., the BGP session is established between the node ASBR1 and the node ASBR2 by using the indirect loopback address. The static route to the loopback address of the node ASBR2 may be configured on the node ASBR1, and the underlying forwarding link is the ECMP formed by the link 1 and the link 2. Similarly, the static route to the loopback address of the node ASBR1 is established on the node ASBR2. The node P2 and the tail node D are connected through the LAG. To facilitate the TE path calculation, the Controller C may collect the network topology information from the network side in advance. In particular, the BGP-LS mechanism may be used by the Controller C to collect: the IGP topology information in each AS, the SR capability information and the corresponding IGP Prefix-SID and Adj-SID of each node in the IGP area, the MSD capability and the ERLD capability information of each node in the IGP area, and connection relationships between the respective ASs and the corresponding BGP Peer Node-SID and Peer Adj-SID.

Figure 6:
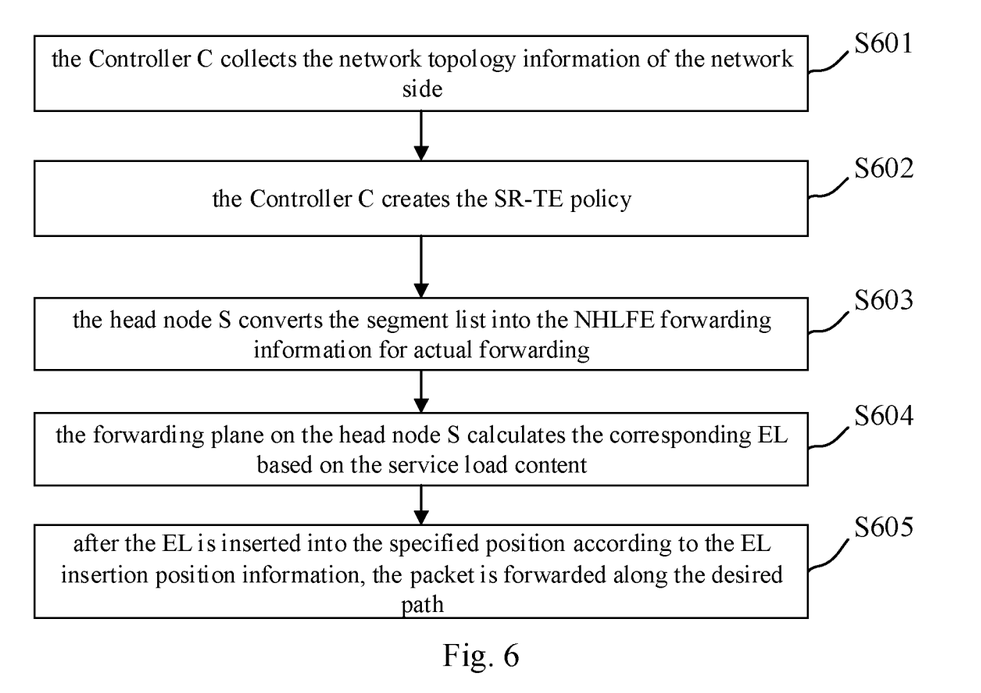
FIG. 6 is another flowchart of a routing management method provided by the embodiment of the present disclosure.

As shown in FIG. 6, it is another flowchart of a routing management method provided by the embodiment of the present disclosure. The routing management method may include step S601 to step S605.

In step S601, the BGP-LS is used by the Controller C to collect the network topology information of the network side. The topology information includes the IGP topology information in the two ASs (i.e., the AS1 and the AS2) and the connection relationship between the two ASs. It is assumed that the MSD and the ERLD collected from each node are 20 and 3 respectively.

In step S602, the Controller C actively creates the SR-TE policy (the SR-TE 200) crossing the ASs from the network-side head node S to the tail node D. The Controller C calculates the path for the SR-TE policy based on the collected network topology information. It is assumed that {Node-SID (to P1), Node-SID (to ASBR1), Peer Node-SID (to ASBR2), Node-SID (to P2), Adj-SID (to LAG)} is the segment list corresponding to the path calculated for the SR-TE policy, the Controller C may send the above-mentioned segment list of the SR-TE to the network-side head node S by sending a BGP Update message. In particular, according to the network topology information, the Controller C may find that the ECMP exists on the Node ASBR1 according to the forwarding of the Peer Node-SID (to ASBR2), and that the ECMP exists on the Node P2 according to the forwarding of the Adj-SID (to LAG). In this case, the Controller C may set the E-flags to be valid in the Segment Sub-TLVs respectively corresponding to the above-mentioned two segments (i.e., the Peer Node-SID (to ASBR2) and the Adj-SID (to LAG)) contained in the Segment List Sub-TLVs of the delivered BGP Update message, to indicate that positions immediately after these two segments are positions into which the EL to be inserted, and this insertion mode does not exceed the ERLD range of the corresponding node.

In step S603, after receiving the segment list of the SR-TE policy (the SR-TE 200), the network-side head node S converts the segment list into the NHLFE forwarding information for actual forwarding. That is, {Node-SID (to P1), Node-SID (to ASBR1), Peer Node-SID (to ASBR2), Node-SID (to P2), Adj-SID (to LAG)} will be converted to the outgoing Label stack {Label (to P1), Label (to ASBR1), Label (to ASBR2), Label (to P2), Label (to LAG)}, and the actual forwarding interface and the next-hop node information are obtained according to the first segment. The network-side head node S delivers the above-mentioned SR-TE 200 and the NHLFE forwarding information to the forwarding plane. In particular, the forwarding plane is notified that positions immediately after Label (to ASBR2) and immediately after Label (to LAG) in the outgoing label stack are positions into which the EL to be inserted.

In step S604, the forwarding plane on the network-side head node S calculates the corresponding EL (recorded as the EL 10) of the service packet to be forwarded along the SR-TE 200 based on the service load content, and inserts the EL into a specified insertion position in the outgoing label stack of the tunnel SR-TE 200. That is, when the service packet is forwarded along the SR-TE 200, the outgoing label stack will be changed to {Label (to P1), Label (to ASBR1), Label (to ASBR2), ELI, EL 10, Label (to P2), Label (to LAG), ELI, EL 10}. Also of note is that in the complete label stack encapsulated in the packet, in addition to the above-mentioned SR-TE policy-related labels, there may also be the service-related labels, such as the VPN label.

In step S605, the packet in which the label stack is encapsulated is forwarded along the desired path; and in particular, when the packet reaches the node ASBR1, according to the ECMP information including the link 1 and the link 2 and existing in the ILM entry queried and hit based on the Label (to ASBR2), the node ASBR1 may continue to read the ELI and the EL 10 in the next layer, and select the link 1 or the link 2 for forwarding according to the value of the EL 10 as the ECMP hash factor. Similarly, when the packet reaches the node P2, the ECMP information (composed of a plurality of member links contained in the LAG) also exists in the ILM entry queried and hit according to the Label (to LAG), and the node P2 may continue to read the ELI and the EL 10 in the next layer, and select a member link of the LAG for forwarding according to the value of the EL 10 as the ECMP hash factor.

Figure 7:
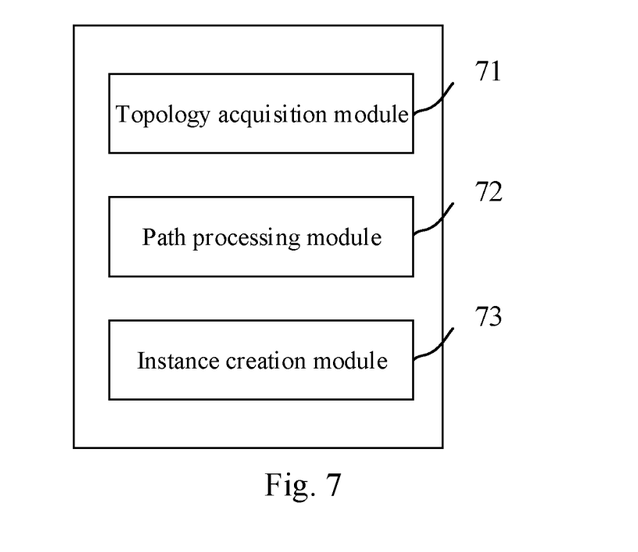
FIG. 7 is a schematic diagram of a structure of a routing management apparatus provided by the embodiment of the present disclosure.

The embodiment of the present disclosure further provides a routing management apparatus. As shown in FIG. 7, it is a schematic diagram of a structure of the routing management apparatus provided by the embodiment of the present disclosure. The apparatus include: a topology acquisition module 71, a path processing module 72, and an instance creation module 73.

The topology acquisition module 71 is configured to obtain network topology information of a network side.

The path processing module 72 is configured to calculate path information of an SR-TE instance to be created based on the network topology information, and send the path information to a network-side head node. The path information includes segment list information and EL insertion position information.

The instance creation module 73 is configured to create the SR-TE instance from the network-side head node to a tail node.

The SR technology is a routing method based on a source node. The source node adds a layer of ordered instruction list information to a data packet, and shortest path forwarding is performed segment by segment in a data plane according to the ordered instruction list information. This approach forces a flow to pass any path and service chain simply by maintaining a state of each flow on the source node, and neither an intermediate node nor a tail node needs to maintain the state of the flow. The SR is able to be applied to a MPLS forwarding plane and an IPv6 forwarding plane, which are called as SR-MPLS and SR-IPv6, respectively. It is generally recommended that the SR-MPLS is used by a core network and the SR-IPv6 is used by an edge network without MPLS forwarding plane (such as a home network, a data center).

The EL is used to implement an ECMP forwarding mechanism on the MPLS forwarding plane. In a label stack encapsulated in a packet to be forwarded, an Entropy Label Indicator (ELI, which is a reserved Label 7) and the EL are generally inserted after a tunnel label, to enable each intermediate node of a tunnel to select a specific path of load balancing based on the EL. It should be noted that in the label stack the EL should follow the ELI immediately. For performing ECMP forwarding on an MPLS label packet in an SR network based on the EL, factors to be considered when inserting the EL into the label stack and recommended algorithms are described. For example, for the SR-TE instance, an MSD capability of the network-side head node, and an ERLD capability of each node contained in a segment list and so on should be considered. As long as these pieces of information are sufficiently obtained, an algorithm can be performed to calculate a position in the label stack into which the EL to be inserted.

A controller may create the SR-TE instance actively; and/or the controller may create the SR-TE instance in response to an SR-TE instance creation request initiated by the network-side head node (i.e., a head node of the SR-TE instance). When the controller creates the SR-TE instance actively or in response to the SR-TE instance creation request from the network-side head node, a calculated SR-TE path result is sent to the network-side head node. In addition to traditional segment list path information (i.e., the segment list information), the calculated SR-TE path result further includes the EL insertion position information.

After receiving the above-mentioned SR-TE path result, the network-side head node creates a corresponding SR-TE forwarding entry on the forwarding plane. In addition to traditional NHLFE information, such as an outgoing interface, a next hop and an outgoing label stack, generated according to the segment list, this forwarding entry further records the corresponding EL insertion position information for the outgoing label stack. Therefore, for service traffic to be carried and forwarded on the SR-TE instance, the network-side head node may insert the ELI and the EL into the outgoing label stack of the packet to be forwarded based on the above-mentioned EL insertion position information, after an algorithm is executed locally to generate a corresponding EL value according to traffic load information. The EL insertion position information may include whether to insert the EL and one or more positions into which the EL to be inserted.

In some examples, the path processing module 72 may be specifically configured to: send the path information to the network-side head node, through a PCEP session established between the controller and the network-side head node; or send the path information to the network-side head node, through a BGP session established between the controller and the network-side head node.

In some examples, the EL insertion position information may be notified based on an extended PCEP in the following ways: in order to represent one SR-TE path, an ERO is used by the PCEP to describe a corresponding segment list, the ERO contains one or more SR-ERO Sub-objects in order, and each SR-ERO Sub-object represents a node segment or an adjacency segment. FIG. 2 shows the schematic diagram of the encapsulation format of the extended PCEP provided by the embodiment of the present disclosure. FIG. 2 specifically illustrates one encapsulation format for the SR-ERO Sub-object, in which F, S, C, and M-flags have been defined. According to the embodiment of the present disclosure, the E-flag (Entropy flag) is newly added on this basis. If the value of the E-flag is 0, it indicates that a position after the segment is not the position into which the EL to be inserted; and if the value of the E-flag is 1, it indicates that the position after the segment is the position into which the EL to be inserted.

In some examples, the EL insertion position information may be notified based on an extended BGP in the following ways: in the SR network, the controller delivers the path calculation result of a SR-TE policy to the network-side head node through a BGP channel, describes the SR-TE policy by using SR Policy SAFI NLRI, the SR-TE policy may contain a plurality of segment lists, and each segment list is represented by a corresponding Segment List Sub-TLV. The Segment List Sub-TLV contains one or more Segment Sub-TLVs in order, and each Segment Sub-TLV represents a node segment, an adjacency segment or a segment of other types. Currently, there are as many as 11 types of Segment Sub-TLVs. The differences of respective types are mainly reflected in that identification information of a segment may be one or a combination of an IP address, an interface index, an SID or an MPLS label. FIG. 3 shows the schematic diagram of the encapsulation format of the extended BGP provided by the embodiment of the present disclosure. FIG. 3 specifically illustrates the common encapsulation format for different types of Segment Sub-TLV, in which the V and A-flags have been defined. According to the embodiment of the present disclosure, the E-flag is newly added on this basis. If the value of the E-flag is 0, it indicates that the position after the segment is not a position into which the EL to be inserted; and if the value of the E-flag is 1, it indicates that the position after the segment is the position into which the EL to be inserted.

In some examples, when the path information is sent to the network-side head node through the PCEP session established between the controller and the network-side head node, the path processing module 72 may be specifically configured to: describe the segment list and the EL insertion position information by using the ERO. The ERO includes at least one SR-ERO Sub-object. Specifically, the encapsulation format of the SR-ERO Sub-object includes the F, S, C, M-flags and E-flag. The value of the E-flag is used for indicating the EL insertion position information.

In some examples, when the path information is sent to the network-side head node through the BGP session established between the controller and the network-side head node, the path processing module 72 may be specifically configured to: describe the segment list and the EL insertion position information by using the Segment List Sub-TLV. The Segment List Sub-TLV includes at least one Segment Sub-TLV. Specifically, the encapsulation format of the Segment Sub-TLV includes the V, A-flags and E-flag. The value of the E-flag is used for indicating that the EL insertion position information is immediately after the Segment Sub-TLV.

In some examples, the SR-TE instance may include: an SR-TE tunnel, and/or the SR-TE policy.

In some examples, the network-side head node may be configured to: convert the path information to NHLFE forwarding information, and send the NHLFE forwarding information to the forwarding plane. For example, after receiving the segment list of the SR-TE instance, the network-side head node converts the segment list into the NHLFE forwarding information for actual forwarding. For example, {Node-SID (to P1), Node-SID (to ASBR1), Peer Node-SID (to ASBR2), Node-SID (to P2), Adj-SID (to LAG)} will be converted to an outgoing Label stack {Label (to P1), Label (to ASBR1), Label (to ASBR2), Label (to P2), Label (to LAG)}, and an actual forwarding interface and next-hop node information are obtained according to the first segment. The network-side head node delivers the SR-TE instance and the NHLFE forwarding information to the forwarding plane. In particular, the forwarding plane is notified that positions immediately after Label (to ASBR2) and immediately after Label (to LAG) in the outgoing label stack are positions into which the EL to be inserted.

In some examples, the network-side head node may be configured to: calculate and obtain a corresponding EL according to service load content of a service packet. The forwarding plane on the network-side head node calculates the corresponding EL of the service packet to be forwarded along the SR-TE instance based on the service load content, and inserts the EL into a specified insertion position in the outgoing label stack of the SR-TE instance. That is, when the service packet is forwarded along the SR-TE instance, the outgoing label stack of a tunnel may be changed to {Label (to P1), Label (to ASBR1), Label (to ASBR2), ELI, EL 10, Label (to P2), Label (to LAG), ELI, EL 10}. Also of note is that in the complete label stack encapsulated in the packet, in addition to the above-mentioned tunnel-related labels, there may also be service-related labels, such as a VPN label.

According to the routing management apparatus provided by the embodiment of the present disclosure, the network topology information of the network side may be obtained; the path information of the SR-TE instance to be created is calculated based on the network topology information, the path information is sent to the network-side head node, and the path information may include the segment list information and the EL insertion position information; and the SR-TE instance from the network-side head node to a tail node is created. Through the calculation of network topology information, the EL insertion position information is carried in the path information, so as to realize the notification and processing of the EL insertion position information, and satisfy a scenario that needs to be implemented based on the EL.

Figure 8:
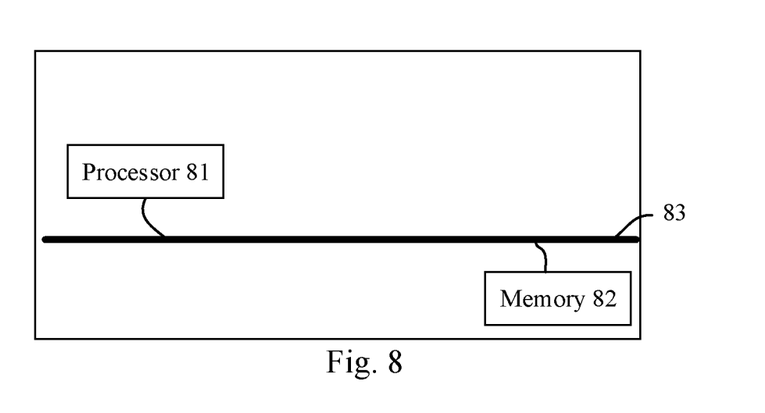
FIG. 8 is a schematic diagram of a structure of a network device provided by the embodiment of the present disclosure.

The embodiment of the present disclosure further provides a network device. As shown in FIG. 8, it is a schematic diagram of a structure of the network device provided by the embodiment of the present disclosure. The network device include: a processor 81, a memory 82 and a communication bus 83. The communication bus 83 is configured to enable communication connection between the processor 81 and the memory 82. The processor 81 is configured to execute one or more computer programs stored in the memory 82, to implement at least one step of the routing management method provided by the embodiment of the present disclosure, which will not be repeated herein.

The embodiment of the present disclosure further provides a computer-readable storage medium including volatile or non-volatile, removable or non-removable medium implemented in any method or technology for storage of information (such as a computer-readable instruction, a data structure, a computer program module or other data). The computer-readable storage media include, but are not limited to, RAM (Random Access Memory), ROM (Read-Only Memory), EEPROM (Electrically Erasable Programmable Read Only Memory), flash memory or other memory technology, CD-ROM (Compact disk Read-Only Memory), Digital Versatile Disks (DVD) or other optical disk storage, magnetic cassette, magnetic tape, magnetic disk storage or other magnetic storage devices, or any other medium which can be used to store desired information and which can be accessed by a computer.

The computer-readable storage medium provided by the embodiment of the present disclosure is configured to store one or more computer programs, which is executable by a processor, to implement at least one step of the routing management method provided by the embodiment of the present disclosure.

The embodiment of the present disclosure further provides a computer program (or referred to computer software), which may be distributed on a computer-readable medium and executed by a computing device, so as to implement at least one step of the routing management method provided by the embodiment of the present disclosure.

The embodiment of the present disclosure further provides a computer program product, which includes a computer-readable system, and the computer program described above is stored on the computer-readable system. The computer-readable system in the embodiment of the present disclosure may include the computer-readable storage medium as shown above.

It will be apparent to those having ordinary skill in the art that all or some of the steps of the methods, functional modules/units in the systems and apparatus disclosed above may be implemented as software (which may be implemented as a computer program code executable by a computing device), firmware, hardware, and suitable combinations thereof. In a hardware implementation, division between the functional modules/units mentioned in the above description does not necessarily correspond to division of physical components. For example, one physical component may have multiple functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit.

In addition, as is well known to those having ordinary skill in the art, communication medium typically embodies a computer-readable instruction, a data structure, a computer program module or other data in a modulated data signal such as a carrier wave or other transport mechanism and includes any information delivery medium. Thus, the present disclosure is not limited to any specific combination of hardware and software.

The foregoing are detailed descriptions of the embodiment of the present disclosure, taken in conjunction with the specific implements thereof, and it is not intended that the present disclosure be limited to the description. For those having ordinary skill in the technical field to which the present disclosure belongs, without departing from the invention concept of the present disclosure, several simple deductions or substitutions can be made, which should be regarded as falling within the protection scope of the present disclosure.

What is claimed is:

1. A routing management method, comprising:
    obtaining, by a controller, network topology information of a network side;
    calculating, by the controller, path information of a Segment Routing-Traffic Engineering (SR-TE) instance to be created, based on the network topology information, and sending the path information to a network-side head node; wherein the path information comprises segment list information and Entropy Label (EL) insertion position information; and
    creating, by the controller, the SR-TE instance from the network-side head node to a tail node, and
    wherein the EL insertion position information comprises whether to insert the EL and one or more positions into which the EL to be inserted.

2. The routing management method of claim 1, wherein creating, by the controller, the SR-TE instance from the network-side head node to the tail node, comprises:
    creating actively, by the controller, the SR-TE instance; and/or
    creating, by the controller, the SR-TE instance, in response to an SR-TE instance creation request initiated by the network-side head node.

3. The routing management method of claim 1, wherein sending, by the controller, the path information to the network-side head node, comprises:
    sending, by the controller, the path information to the network-side head node, through a Path Computation Element Communication Protocol (PCEP) session established between the controller and the network-side head node; or
    sending, by the controller, the path information to the network-side head node, through a Border Gateway Protocol (BGP) session established between the controller and the network-side head node.

4. The routing management method of claim 3, wherein when the path information is sent to the network-side head node through the PCEP session established between the controller and the network-side head node, sending, by the controller, the path information to the network-side head node, comprises:
    describing the segment list information and the EL insertion position information by using a first object; wherein the first object comprises at least one first-object Sub-object.

5. The routing management method of claim 4, wherein an encapsulation format of one first-object Sub-object of the at least one first-object Sub-object comprises a first flag; wherein a value of the first flag is used for indicating whether it is the EL insertion position information immediately after the first-object Sub-object.

6. The routing management method of claim 3, wherein when the path information is sent to the network-side head node through the BGP session established between the controller and the network-side head node, sending, by the controller, the path information to the network-side head node, comprises:
    describing the segment list information and the EL insertion position information by using a second object; wherein the second object comprises at least one second-object Sub-object.

7. The routing management method of claim 6, wherein an encapsulation format of one second-object Sub-object of the at least one second-object Sub-object comprises a second flag; wherein a value of the second flag is used for indicating whether it is the EL insertion position information immediately after the second-object Sub-object.

8. The routing management method of claim 1, wherein the SR-TE instance comprises: an SR-TE tunnel, and/or an SR-TE policy.

9. The routing management method of claim 1, further comprising:
    converting, by the network-side head node, the path information to Next Hop Label Forwarding Entry (NHLFE) forwarding information; and
    sending, by the network-side head node, the NHLFE forwarding information to a forwarding plane;
    wherein the NHLFE forwarding information comprises the EL insertion position information.

10. The routing management method of claim 1, further comprising:
    calculating, by the network-side head node, in response to determining that there is a service packet to be carried and forwarded on the SR-TE instance, a corresponding EL according to service load content of the service packet; and
    inserting, by the network-side head node, the EL into a specified position in a label stack encapsulated in the service packet, according to the EL insertion position information.

11. A non-transitory computer-readable storage medium having one or more computer programs stored thereon, wherein the one or more computer programs are configured to, when executed by one or more processors, a step of the routing management method of claim 1 is implemented.

12. A network device, comprising a processor, a memory, and a communication bus, wherein
the communication bus is configured to enable a communication connection between the processor and the memory; and
the processor is configured to execute one or more computer programs stored in the memory, to implement:
obtaining, by a controller, network topology information of a network side;
calculating, by the controller, path information of a Segment Routing-Traffic Engineering (SR-TE) instance to be created, based on the network topology information, and sending the path information to a network-side head node; wherein the path information comprises segment list information and Entropy Label (EL) insertion position information; and
creating, by the controller, the SR-TE instance from the network-side head node to a tail node, and
wherein the EL insertion position information comprises whether to insert the EL and one or more positions into which the EL to be inserted.

13. The network device of claim 12, wherein the processor is configured to execute the one or more computer programs stored in the memory to implement:
creating actively, by the controller, the SR-TE instance; and/or
creating, by the controller, the SR-TE instance, in response to an SR-TE instance creation request initiated by the network-side head node.

14. The network device of claim 12, wherein the processor is configured to execute the one or more computer programs stored in the memory to implement:
sending, by the controller, the path information to the network-side head node, through a Path Computation Element Communication Protocol (PCEP) session established between the controller and the network-side head node; or
sending, by the controller, the path information to the network-side head node, through a Border Gateway Protocol (BGP) session established between the controller and the network-side head node.

15. The network device of claim 14, wherein when the path information is sent to the network-side head node through the PCEP session established between the controller and the network-side head node, the processor is configured to execute the one or more computer programs stored in the memory to implement:
describing the segment list information and the EL insertion position information by using a first object; wherein the first object comprises at least one first-object Sub-object.

16. The network device of claim 15, wherein an encapsulation format of one first-object Sub-object of the at least one first-object Sub-object comprises a first flag; wherein a value of the first flag is used for indicating whether it is the EL insertion position information immediately after the first-object Sub-object.

17. The network device of claim 14, wherein when the path information is sent to the network-side head node through the BGP session established between the controller and the network-side head node, the processor is configured to execute the one or more computer programs stored in the memory to implement:
describing the segment list information and the EL insertion position information by using a second object; wherein the second object comprises at least one second-object Sub-object.

18. The network device of claim 17, wherein an encapsulation format of one second-object Sub-object of the at least one second-object Sub-object comprises a second flag; wherein a value of the second flag is used for indicating whether it is the EL insertion position information immediately after the second-object Sub-object.

19. The network device of claim 12, wherein the SR-TE instance comprises: an SR-TE tunnel, and/or an SR-TE policy.

* * * * *